United States Patent [19]

Otte

[11] 4,151,826
[45] May 1, 1979

[54] HYDRAULIC TENSIONING SEAL

[75] Inventor: Rudolf Otte, Oakland, N.J.

[73] Assignee: Silicon Technology Corporation, Oakland, N.J.

[21] Appl. No.: 901,234

[22] Filed: Apr. 28, 1978

[51] Int. Cl.² .............................................. B28D 1/04
[52] U.S. Cl. ..................................... 125/15; 51/73 R; 269/22; 279/4
[58] Field of Search ................... 125/12, 15; 51/73 R, 51/206 R; 92/245; 269/22; 279/4

[56] References Cited

U.S. PATENT DOCUMENTS

| | | | |
|---|---|---|---|
| 2,598,609 | 5/1952 | Samuel | 92/245 |
| 2,884,292 | 4/1959 | Doner | 92/245 |
| 3,762,008 | 10/1973 | Volki | 125/15 |
| 3,827,421 | 8/1974 | Schumacher | 125/15 |
| 4,014,311 | 3/1977 | Steere | 125/15 |

*Primary Examiner*—Harold D. Whitehead
*Attorney, Agent, or Firm*—Amster, Rothstein & Engelberg

[57] ABSTRACT

An improved fluid-tight tensioning seal is provided for use in apparatus of the type wherein an inside diameter cutting blade is mounted in a circular saw blade housing, the blade being continuously tensioned during the cutting operation. The tensioning seal comprises two pieces, one of which is elastic and moves in sealing relationship within a channel provided in the housing in response to pressurized fluid. The second piece is substantially rigid, abuts the first piece on one side and has a contoured projection extending from its other side for engaging and tensioning the blade.

13 Claims, 5 Drawing Figures

HYDRAULIC TENSIONING SEAL

DESCRIPTION OF THE INVENTION

The present invention relates generally to article tensioning devices and, in particular, to an improved two-piece tensioning seal for use in an hydraulically operated article tensioning device.

Recently, in the electronics industry, there has been an increasing need for slicing extremely thin sections or wafers from large crystals for solid state applications. For example, extremely thin slices of silicon are often required on the order of 0.007 inches (0.178mm) in axial dimension. The slices are usually cut from larger silicon crystals which can be economically grown, and are sawed off in the form of wafers of the required thickness.

Naturally, in view of the great expense of raw silicon material, minimization of waste of the silicon is a prime consideration, as is uniformity of size and surface configuration of the wafers which often are as large as three inches in diameter. In order to provide wafers of the required size and surface characteristics, while also minimizing waste, special cutting blades have been devised for slicing silicon wafers from larger ingots.

One of the required characteristics of the cutting blades is that they must be thin enough to produce the desired thin wafer and minimize waste, and must also have a rigidity sufficient to slice through a three to five inch diameter silicon crystal. This combination of thinness and rigidity is generally not attainable with the usual cutting blade having a cutting edge on its outside circumference.

As noted in U.S. Pat. Nos. 3,827,421 issued Aug. 6, 1974, and 4,014,311 issued Mar. 29, 1977, and in copending U.S. Pat. application Ser. No. 861,305 filed Dec. 16, 1977, all assigned to the assignee of the present application, the teachings of all of the foregoing being incorporated herein by reference, a cutting blade which provides the required thinness and rigidity, coupled with the required cutting depth capability is a thin, circular saw blade clamped about its outside diameter and having an opening centrally thereof to form an inside diameter cutting edge. This type of blade is hereinafter referred to as an "ID" blade.

Typically, an ID blade is utilized in a slicing machine wherein the blade is clamped in a housing about its circumference, with the surface of the blade being uniformly tensioned to provide the cutting edge of the inside diameter opening with sufficient rigidity to produce uniform results.

Since it is well known that fluid transmits pressure equally in all directions, an hydraulic fluid channel including a means of ingress and egress of hydraulic fluid therefrom was formed in a clamping ring mounted to the housing, with an opening of the channel confronting a clamped saw blade. A recess channel was radially aligned with the fluid channel on one side of the ID blade clamping and tensioning apparatus, and hydraulic fluid was made to impinge upon the clamped blade, thereby uniformly deforming the blade and resulting in a uniformly tensioned and clamped blade.

While the apparatus described was satisfactory in some respects and superior to mechanically clamping and tensioning the ID blade, there was often the problem of leakage of the hydraulic fluid with consequent loss of tensioning pressure, and consequent disruption of the slicing process. When the ID blade broke, virtually all of the fluid would leak out of the tensioning fluid channel.

In order to solve some of the disadvantages of the hydraulic tensioning apparatus described hereinbefore, a gasket was devised for retaining the hydraulic fluid within the fluid channel, thereby preventing direct contact of the fluid with the saw blade. The gasket was retained within the blade clamping apparatus by radially inner and outer projecting ears which mated with similarly configured radially inner and outer recess channels within the clamping and tensioning apparatus. Such a gasket is shown in the U.S. Pat. No. 3,827,421 identified hereinbefore.

The gasket shown in the U.S. Pat. No. 3,827,421 was relatively thin in cross section at its main body part; and, consequently, the fluid channel thereof required a great deal of tensioning fluid therein which fluid is relatively expensive and which therefore increased the cost of operation of the blade tensioning and clamping apparatus should be fluid be lost during operation of the machine. This loss of fluid occurred whenever the gasket ruptured, which was not infrequently due to the thin axial dimension of its main body part and the degree to which the gasket was distended during operation. Also, fluid loss would sometimes occur due to the difficulty of properly inserting the "ears" in the channels.

In addition, at least partially in view of the thin axial dimension of the main body part of the gasket of the U.S. Pat. No. 3,827,421, the gasket would often develop a permanent deformation or "set" as a result of tension applied to it over a long period of time. Thus, when the blade required replacing either because it began to dull or because it broke, the "set" of the gasket rendered it very difficult if not impossible to use the same gasket with the new blade, thereby often requiring insertion of a new gasket upon each replacement of the blade. The requirement of a new gasket each time a blade was replaced not only increased the expense of operating the cutting machine but also increased the inactive or "down" time of the machine, thereby resulting in costly production delays.

Solving some of the problems inherent in the single piece gasket shown in the U.S. Pat. No. 3,827,421 is a two-piece gasket such as shown and described in the U.S. Pat. No. 4,014,311.

The patented two-piece gasket comprises an outer sleeve of a given durometer which is secured within the annular fluid channel in the machine by radially inner and outer projecting ears located within like-configured radially inner and outer recesses in the channel. A plug of different durometer is located within the outer sleeve, and is moved by fluid pressure on the outer sleeve so as to impinge upon and deform the saw blade.

Despite the advantages of the one and two-piece gaskets thus far described, and the problems which they solved, they each had disadvantages, difficulties and problems due in part to the positioning of the annular ears within the inner and outer channel recesses.

In addition, in view of the fact that the projecting ears of the patented gaskets are restrained from axial movement by engagement with the channel recesses, movement of the forward working surface of either gasket against the blade surface is somewhat constrained. This problem of restricted movement of the gasket is overcome by the single piece construction which is the subject of application Ser. No. 861,305, wherein no restraining sealing ears project from the gasket at all, the gasket being free to slide in its entirety within the channel towards the blade surface. The present invention provides a two-piece tensioning seal which also overcomes disadvantages inherent in the gaskets discussed above.

Two-piece hydraulic assemblies for power movement are known and used in piston and cylinder arrangements for communicating hydraulic pressure to brake shoes, as disclosed in U.S. Pat. Nos. 2,598,609 to Samuel and 2,884,292 to Doner. These known structures are, however, not suitable for use in the blade mounting and tensioning apparatus described herein, in that the piston members disclosed for contacting and moving the brake shoes are not designed nor intended to deform and tension a planar metallic object such as an ID cutting blade, their working surfaces being concave in cross section to provide seats for the brake shoe elements to be moved.

Also, the prior piston members are cylindrical and cannot be used within an annular recess channel as in blade mounting and tensioning apparatus. As the prior piston members must be deeply skirted to retain a steady orientation during operation, their use in the apparatus would require deep fluid cylinders to be precisely machined in the clamping member, thereby increasing costs of manufacture.

It is therefore an object of the present invention to provide an improved tensioning seal which facilitates uniform hydraulic tensioning of an ID saw blade.

It is another object of the present invention to provide a two-piece tensioning seal which effectively seals fluid within an hydraulic channel over a full range of operating pressures.

It is still another object of the present invention to provide a slidable, self sealing tensioning seal for use in a blade mounting and tensioning apparatus wherein the ring is slidable between a first, blade insertion-removal position and a second, axially extended blade tensioning position.

It is yet another object of the present invention to provide a slidable two-piece tensioning seal wherein one of the pieces is substantially rigid and operates to deform the blade, and the other piece is resilient and operates to move the rigid piece in response to fluid pressure.

In accordance with a specific embodiment of the present invention, an improvement is provided in a blade mounting and tensioning apparatus of the type which includes first and second confronting annular blade clamping members. The first clamping member has an annular fluid channel having an opening which confronts one side of the blade. An annular recess channel is provided within the second clamping member which is radially aligned with the annular fluid channel and which has an opening therein which confronts the other side of the blade.

The improvement comprises an annular two-piece blade tensioning seal for insertion in the fluid channel in the first clamping member, one of the pieces being substantially rigid and operative to deform the blade when it is moved within the channel to confront the blade, the other piece being resilient and operative to move the rigid piece in response to fluid pressure applied to the other piece within the channel and to seal the fluid in the channel.

The above brief description, as well as further objects, features and advantages of the present invention will be more fully understood by reference to the following detailed description of the presently preferred, but nonetheless illustrative embodiment, in accordance with the present invention, when taken in conjunction with the accompanying drawing, wherein.

Figure 1:
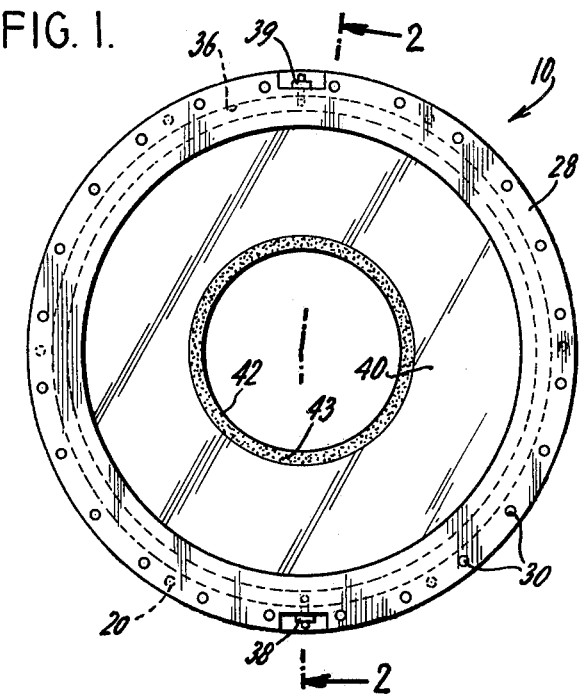
FIG. 1 is a front view of a saw blade and a saw blade housing in which the present invention can be used.
Figure 2:
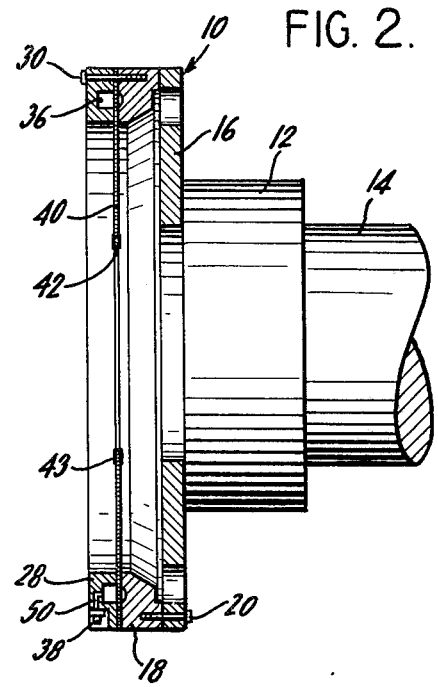
FIG. 2 is a sectional view taken substantially along the line 2—2 of FIG. 1 and looking in the direction of the arrows.

Referring now in detail to the drawing and particularly to FIGS. 1 and 2, in accordance with an illustrative embodiment demonstrating objects and features of the present invention, there is provided a saw blade housing, generally designated by the reference numeral 10, which is attached, by means of a hub 12 to a drive shaft 14 of an unshown slicing machine.

It is to be understood that while the blade tensioning device of the present invention is described as useable with an ID cutting blade for slicing thin sections of a silicon crystal, such a use is merely illustrative of the application of the present invention and other applications thereof are possible and are considered to be within the contemplation and scope hereof.

In the preferred embodiment, a spindle plate 16 is shown attached to the hub 12 by any conventional means. A generally cylindrical, annular tensioning ring 18 is attached to the spindle plate 16 by a plurality of tensioning ring bolts 20 which are circumferentially spaced about the saw blade housing and which pass through openings therein and are received within threaded openings in the tensioning ring. The tensioning ring 18 is thereby securely fastened to the spindle plate 16.

Figure 3:
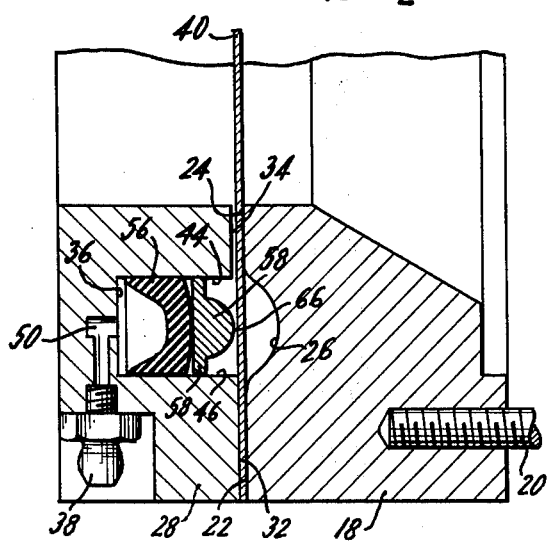
FIG. 3 is an enlarged fragmentary sectional view of the saw blade housing of FIG. 1, showing the tensioning seal of the present invention in place without pressurized hydraulic fluid applied thereto.
Figure 4:
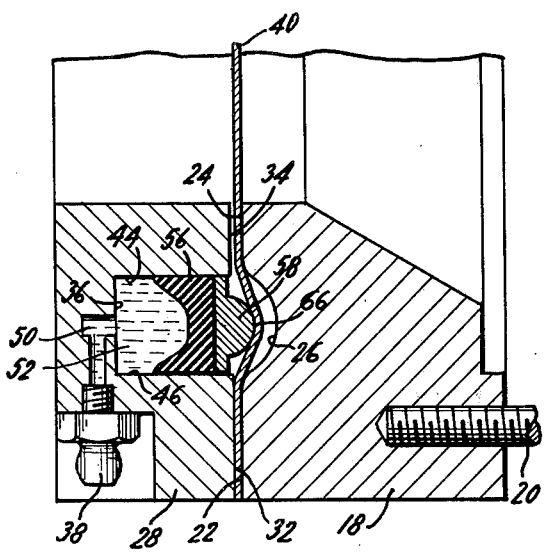
FIG. 4 is a view similar to FIG. 3 with pressurized hydraulic fluid applied to the seal.

The tensioning ring 18 includes a radially outer clamping surface 22 which is best seen by reference to FIGS. 3 and 4. The clamping surface 22 extends axially a given distance from the spindle plate 16. The apparatus 10 includes a non-clamping or clearance surface 24, which is best seen by reference to FIGS. 3 and 4, and is located on the tensioning ring 18 radially inward of its clamping surface 22. The clearance surface 24 of the tensioning ring 18, similar to the clamping surface 22, extends axially from the tensioning ring 18. A region between the surface 22 and 24 defines an annular tensioning ring recess channel 26 which is generally U-shaped in partial cross-section with the open part of the U facing axially outwardly from the spindle plate 16.

An annular clamping ring 28, of substantially the same diameter as the tensioning ring 18, is removably fixed thereto by means of clamping ring bolts 30 which threadably engage openings within the tensioning ring 18 (see FIG. 2).

The clamping ring 28 includes a radially outer clamping surface 32 on the surface thereof which confronts the clamping surface 22 of the tensioning ring. On the clamping ring 28, located parallel to and confronting the clearance 24 of the tensioning ring 18, is a radially non-clamping or clearance surface 34. The clearance surface 34 is axially displaced from the clamping surface 32 of clamping ring 28 as shown in FIGS. 3 and 4.

The clamping ring 28 includes an annular, circumferential fluid channel or cavity 36 which is generally U-shaped in partial cross section and which is arranged with the open end of the U confronting the open end of the generally U-shaped cavity 26 in tensioning ring 18. The cavity is generally radially aligned with the cavity 26 and is connected, in a manner described in more detail hereinafter, to inlet and outlet hydraulic fluid valves 38, 39. The parallel sides of the U of the fluid channel 36 are contiguous to and form the respective radially inner and outer boundaries of the clamping ring clamping and clearance surfaces 32, 34 respectively (see FIGS. 3 and 4).

A generally toroidal plane saw blade 40 is positioned with locating-pin holes therein (not shown) over locating pins (also not shown) which project from the tensioning ring 18. The clamping ring 28 includes openings therein (not shown) which correspond to the locating pins. During assembly of the subject device, the locating pin openings in the clamping ring are aligned with and placed over the locating pins. Each of the plurality of the clamping ring bolts 30 about the periphery of the saw blade housing 10 are then tightened or torqued to the same value to position the saw blade 40 and clamp the same relative to the saw blade housing.

The saw blade 40 includes an inside diameter cutting edge 42 which includes a coat of diamond bort 44 radially inward of the edge to aid in maintaining the cutting capabilities of the blade 40 even after repeated use. The diamond bort 44 is affixed to the blade 40 in any conventional manner such as by the use of well-known adhesives.

Referring now specifically to FIGS. 3 and 4, the annular toroidal channel 36 is, as noted hereinbefore, generally U-shaped with the open end of the U opening toward and confronting the open end of the tensioning ring recess channel 26. Wall surfaces 44 and 46 (FIG. 4) defining the channel 36 are substantially smooth and parallel to one another. The bottom end of the U-shaped channel 36 (shown as being to the left in FIGS. 3 and 4) is connected through fluid conduit 50 at a circumferential location within the saw blade housing 10 to hydraulic fluid inlet valve 38. Hydraulic fluid inlet valve 38 may be any conventional type of inlet check valve for the introduction of hydraulic tensioning fluid 52 (FIG. 4) into cavity 36 through the conduit 50.

Circumferentially spaced approximately 180° within the saw blade housing 10 and specifically within the clamping ring 28 is the hydraulic fluid outlet valve 39 which is connected through a conduit similar to the conduit 50 (which similar conduit is not shown) to the interior of the annular toroidal fluid channel 36. The hydraulic fluid outlet valve 39 may be of any convenient construction and is utilized to permit bleeding of any trapped air upon the introduction into the channel 36 of hydraulic tensioning fluid 52; and, under appropriate circumstances, to permit bleeding of the hydraulic fluid 52.

Figure 5:
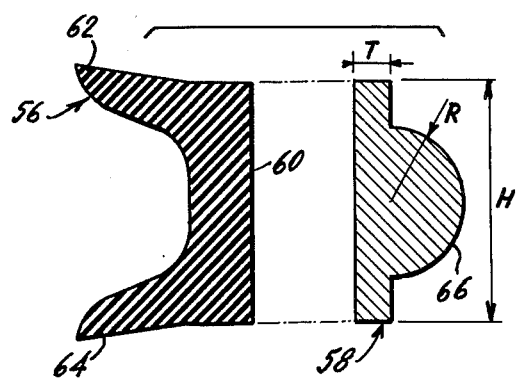
FIG. 5 is an enlarged partial cross sectional view of the seal, its component pieces being separated from one another for purposes of illustration.

Disposed within the annular toroidal fluid channel 36 is the two-piece tensioning seal of the present invention. As seen in partial cross section in FIG. 5, the seal comprises a generally U-shaped, elastic annular sealing ring 56, the open end of which is arranged to confront the pressurized fluid 52 in the chamber 36, and the closed or flattened end of which is arranged to abut a corresponding surface on a substantially rigid annular deforming ring 58.

The sealing ring 56 includes a main body portion 60 of generally rectangular cross-section, and a pair of generally triangularly shaped outwardly extending sealing lips 62 and 64, respectively, for slidingly and sealingly engaging corresponding walls 44 and 46 of the fluid channel 36, respectively. Sealing ring 56 is preferably made of polyurethane capable of withstanding about 1,000 P.S.I., and is similar in design to the movable sealing piston disclosed in the above pending application Ser. No. 861,305. However, although it is permissible, it is not necessary that the ratio of thickness to height of the main body portion 60 be as great as one-third. The relative thickness may be reduced provided the sealing ring 56 continues to properly seal pressurized fluid 52 in the channel 36 as discussed below.

The deforming member 58 has a projection 66 extending forwardly therefrom, the projection 66 being preferably contoured to define an arcuate partial cross section a shown. Deforming ring 58 is preferably formed of rigid material such as heat treated steel, and is of a height H (FIG. 5) such that it can freely slide within the fluid channel 36 in the clamping ring 28. The thickness T of the edges of the deforming ring 58 may be relatively small, as the deforming member 58 will still maintain a proper orientation throughout its working movement within the fluid channel 36 as shown in FIGS. 3 and 4. It will be understood that owing to the particular geometry of the annular fluid channel 36 it is not required that the deforming member 58 have relatively thick edges for slidingly engaging the fluid channel walls 44, 46, respectively, in order to maintain a proper working orientation and not bind within the channel 36. Thus, unlike the cylindrical piston members of the known prior art, which require a relatively wide area of contact between their sides and the cylinder walls in which they move, the deforming ring 58 requires substantially less side area to operate properly within the fluid channel 36. At any rate, deforming ring 58 is of sufficient height and thickness to enable smooth sliding movement within fluid channel 36.

The radius R of the arcuate projection 66 is preferably such that substantial point deforming contact is established between the projection 66 and the surface of the ID blade 40 as the present tensioning seal is moved by hydraulic fluid pressure to deform and tension the blade 40 as shown in FIG. 4.

As the deforming ring 58 is of rigid material, it will be appreciated that substantially full deforming force is transmitted to the blade 40 through the deforming ring 58 in the vicinity of the forwardmost edge of the projection 66, the force diminishing rapidly in directions radially inward and outward from the forwardmost edge of projection 66. It is accordingly preferred that the deforming ring 58 be of a material, and the arcuate partial cross section of the projection 66 be of a radius R, such that the blade 40 slides over the projection 66 as it is being forced into the recessed opening 26 of the tensioning ring 18 by the deforming ring 58. This sliding movement of the deforming blade 40 over the projection 66 enables more uniform radial tensioning of the blade, as substantially full deforming force is maintained in the vicinity of the forwardmost edge of projection 66, and is uniformly circumferentially applied to the blade 40. In prior blade tensioning configurations, a relatively large surface area of an elastic tensioning seal is urged directly against and deforms the blade to be tensioned. In such instances, a relatively high coefficient of friction exists between the elastic seal and the blade which inhibits sliding movement of the blade over the seal. Accordingly, radial tensioning of the blade is not as uniform as may be obtained with the seal of the present invention.

Importantly, the present preferred configuration of the deforming ring 58 provides the same degree of blade deformation and resultant tensioning with significantly lower hydraulic fluid pressure than would be required with the prior one and two-piece blade tensioning seals. For example, instead of using 1500 P.S.I. to obtain 0.064 inch deformation of an eight-inch radius ID blade, a pressure of approximately 900 P.S.I. provides the same deformation when using the present tensioning seal.

The above-mentioned reduction in operating hydraulic pressure enables the attainment of other desirable structural features in the blade mounting and tensioning apparatus in which the present seal can be used. For example, it will be appreciated that it is desirable that the ID blade 40 be clamped as firmly as possible against the clamping surface 22 of the tensioning ring 18 by the clamping ring 28 which is secured to the tensioning ring 18 by the clamping bolts 30. It will also be understood that a relatively high hydraulic pressure developed within the fluid channel 36 and communicated to the blade 40 would cause an unloading force to be exerted on the clamping ring bolts 30, which in turn would act to cause improper and uneven clamping pressure to be developed about the circumference of the blade 40 and thereby impair its operation.

Moreover, the blade 40 is maintained substantially flat against the tensioning ring clearance surface 24 when deformed and tensioned by the present seal, so that the clearance surface 34 on the clamping ring 28 may be brought in close proximity (e.g., 0.1 to 0.2 mils) to the confronting surface of the blade 40 and still allow the blade to be deformed and tensioned by the deforming ring 58. This was not possible with prior known blade-tensioning seals which tended to cause the blade 40 to deflect away from the clearance surface 24 when high hydraulic pressure was communicated to the blade. The narrower gap between both of the clearance surfaces 24, 34 is significant in that it prevents uneven deflection of the blade 40 within this gap around the periphery of the blade-mounting apparatus, and thereby eliminates fluttering movement of the blade within the gap as the blade slices through semi-conductor material at high rotational speeds. Furthermore, narrowing of the aforesaid gap prevents silicon or other semi-conductor sludge from being thrown therein and allows the entire rotating apparatus to remain in balance. As the blade 40 is maintained securely clamped during operation, a lessening of overall vibration also results.

During assembly of the apparatus 10, the tensioning seal of the present invention is placed within the fluid channel 36 by first squeezing the sealing lips 62, 64 on the sealing ring 56 towards each other, and then sliding the entire ring 56, lips first, along the polished walls 44, 46 of the channel 34 until the ring 56 is sufficiently deep to allow the deforming ring 58 to be inserted thereover without the projection 66 extending beyond the channel 36, as shown in FIG. 3. Naturally, by virtue of the lips 62, 64 being squeezed towards one another, the deforming ring contacting surface of the sealing ring 56 assumes a gently convex outward curved configuration as shown in FIG. 3.

The sealing ring 56 being preferably formed of polyurethane and able to withstand operating pressures in the order of 1000 P.S.I. transmitted to it by the hydraulic fluid 52 (in a manner to be described hereinafter), the elastic properties of the sealing ring material act to urge the lips 62, 64 outwardly against the polished fluid channel walls 44, 46 of the channel 36, thereby acting, in conjunction with the generally U-shaped fluid contact surface of the sealing ring 56, to seal the hydraulic fluid 52 within the channel 36.

After the deforming ring 58 is inserted in the fluid channel 36, over the sealing ring 56 and with the projection 66 facing outwardly, as shown in FIG. 3, the apparatus 10 is assembled with the saw blade 40 properly clamped in position. Hydraulic fluid 52 is pumped into the fluid channel 36 through the inlet valve 38, entering through the fluid inlet conduit 50. The hydraulic fluid bleed valve 39 is opened at this time to permit air trapped in the channel 36 to escape. When hydraulic fluid, without bubbles, flows from the bleed valve 39 which is preferably located in an upright position as shown in FIG. 1, the bleed valve 39 is then closed.

During operation, additional hydraulic fluid 52 is pumped into inlet valve 38 until the fluid in the channel 36 is pressurized to about 900 P.S.I., in the event an 8-inch ID cutting blade is used. According to well known laws of physics, the hydraulic fluid 52 exerts this pressure equally in all directions on the chanel 36, the conduit 50 and, of course, the fluid contact surface of the sealing ring 56. As the fluid 52 is being added, the sealing ring 56 slides to abut the confronting surface of the deforming ring 56, so that both rings thereafter move together towards the blade 40.

As may be seen in FIG. 3, when the ID blade 40 is clamped but not tensioned, the outer circumferential portion of the ID blade is held between the clamping and tensioning ring clamping surfaces 32 and 22, respectively, with its right-hand surface abuting the tensioning ring clearance surface 24. By virtue of the assembled location of the clamping ring clearance surface 34, the ID blade 40 does not directly abut the surface 34, but a gap in the order of 0.1 to 0.2 mils is provided. Accordingly, the ID blade is free to be stretched substantially downwardly through this gap upon tensioning of the blade, as described below.

Thus, when the hydraulic fluid 52 is pressurized, the sealing ring 56 moves to the right, abuts the deforming ring 58, and moves it to the right until it contacts the confronting left-hand surface of the ID blade 40. As shown in FIG. 4, the ID blade 40 is then deformed into the tensioning ring recess 26 thereby radially tensioning the blade. By virtue of the equal pressure throughout the entire fluid channel 36, and the substantial point contact established between the deforming ring 58 and the blade surface, the ID blade 40 is evenly deformed and tensioned throughout.

As indicated above, the sealing ring 56 is of such geometry and material that a proper fluid seal is maintained against the walls 44, 46 of the fluid channel 36 to prevent the fluid 52 from leaking out of the channel 36 from commencement of pressurization of the fluid, until the desired degree of deformation of the ID blade 40 into the tensioning ring recess 26, and the desired tensioning of the blade is attained.

When, either because of failure of the ID blade 40 or dulling of its cutting edge 42, it becomes necessary to change the blade, the bleed valve 39 is opened to relieve the fluid pressure in the channel 36, the clamping ring bolts 30 are loosened and removed, and the clamping ring 28 is removed from the apparatus 10. The fragmented or dulled ID blade 40 is removed from the locating pins and a new blade placed thereon.

In prior art apparatus it was necessary, in order to properly clamp a new ID blade, to either replace the tensioning seal therein if it had developed a permanent set and bowed outwardly (thereby protruding beyond the clamping ring clamping surface 32) or, if it was a two-piece seal having a filler ring, to reverse the filler ring disposed within the outer secured sleeve of the seal.

However, with the tensioning seal of the present invention, a user need only push the deforming ring 58 back down into the fluid channel 36 a sufficient amount so that the projection 66 does not extend beyond the clamping ring clamping surface 32 (FIG. 3). Of course, the sealing ring 56 will also be urged back down within the channel 36 as the deforming ring 58 abuts and pushes against it. The clamping ring bolts 30 are then re-torqued to the desired value, and sufficient pressure is then communicated to the hydraulic tensioning fluid 52 in the manner already discussed, thereby urging the deforming ring 58 of the present seal against the new ID blade 40 to tension the new blade the desired amount.

In view of the particular construction and arrangement of the present tensioning seal, repositioning of the seal can be accomplished relatively easily, the seal itself has a longer life, and changing of blades is less time consuming and greatly simplified. Also, replacement of one or both pieces of the present seal is facilitated by the unrestrained sliding movement of the pieces within the channel which allows them to be easily removed.

As will be readily apparent to those skilled in the art, the invention may be used in other specific forms and for other purposes without departing from its spirit or essential characteristics. For example, although the sealing ring 56 is preferably in the form disclosed hereinabove, this ring may possibly be in the form of the prior one-piece sealing gasket as disclosed in the above U.S. Pat. No. 3,827,421. Of course, use of such a sealing ring would then require grooves to be machined in the fluid channel walls, as described in that patent.

The present embodiment is, therefore, to be considered as illustrative and not restrictive, the scope of the invention being indicated by the claims rather than by the foregoing description, and all changes which come within the meaning and range of equivalents of the claims are therefore intended to be embraced therein.

I claim:

1. An improved blade mounting and tensioning apparatus of the type which includes first and second confronting annular blade clamping members, said first clamping member having an annular fluid channel therein for containing hydraulic fluid, said fluid channel having an opening confronting one side of a blade operatively disposed in said apparatus, said second clamping member having an annular recess channel therein in radial alignment with said fluid channel and having an opening therein confronting the other side of said blade, the improvement comprising an annular blade tensioning seal disposed in said fluid channel, said tensioning seal including a substantially rigid annular deforming ring having a generally curvilinear projection constructed and arranged to confront and deform said blade into said recess channel, and an elastic annular sealing ring constructed and arranged to confront and seal pressurized fluid in said fluid channel and being slidable to urge said deforming ring to engage said blade and deform said blade into said recess channel in response to said pressurized fluid.

2. The improved apparatus according to claim 1, wherein said deforming ring has a projection extending therefrom towards said blade, said projection being contoured to establish substantial point deforming contact with said blade when said deforming ring deforms said blade.

3. The improved apparatus according to claim 2, wherein said projection is arcuate in partial cross section.

4. The improved apparatus of claim 3, wherein said deforming ring comprises heat treated steel.

5. The improved apparatus according to claim 1, wherein said fluid channel includes a pair of substantially smooth side walls and said sealing ring includes seaing means constructed and arranged to render it substantially uniformly slidable within said fluid channel.

6. The improved apparatus of claim 5, wherein said sealing means includes a pair of sealing lips extending outwardly from said sealing ring towards the closed end of said fluid channel in sliding engagement with each of said side walls, respectivey.

7. The improved apparatus of claim 6, wherein said sealing ring comprises polyurethane.

8. An improved blade mounting and tensioning apparatus of the type which includes first and second confronting annular blade clamping members, said first clamping member having an annular fluid channel therein for containing hydraulic fluid, said fluid channel having an opening confronting one side of a blade operatively disposed in said apparatus, said second clamping member having an annular recess channel therein in radial alignment with said fluid channel and having an opening therein confronting the other side of said blade, the improvement comprising an annular blade tensioning seal disposed in said fluid channel, said tensioning seal including a substantially rigid annular deforming ring for deforming said blade into said recess channel, siad deforming ring being of sufficient height and thickness to enable smooth sliding movement within said fluid channel, said deforming ring having a projection which is arcuate in partial cross section extending towards said blade for establishing substantial point deforming contact with said blade when said deforming ring deforms said blade, and an elastic annular sealing ring for confronting and sealing pressurized fluid in said fluid channel and being slidable for urging said deforming ring to engage and deform said blade into said recess channel in response to said pressurized fluid, said sealing ring including a pair of sealing lips extending outwardly towards the closed end of said fluid channel in sliding engagement with said fluid channel.

9. The improved apparatus of claim 8, wherein said deforming ring comprises heat treated steel.

10. The improved apparatus of claim 8, wherein said sealing ring comprises polyurethane.

11. An improved blade mounting and tensioning apparatus of the type which includes first and second confronting annular blade clamping members, said first clamping member having an annular fluid channel therein for containing hydraulic fluid, said fluid channel having an opening confronting one side of a blade operatively disposed in said apparatus, said second clamping member having an annular recess channel therein in radial alignment with said fluid channel and having an opening therein confronting the other side of said blade, the improvement comprising an annular blade tensioning seal disposed in said fluid channel, said tensioning seal including a substantially rigid annular deforming ring for deforming said blade into said recess channel, said deforming ring being of sufficient height and thickness to enable smooth sliding movement within said fluid channel, said deforming ring having a projection extending towards said blade being constructed and arranged to enable said blade to slide with respect thereto when said deforming ring deforms said blade so that said blade is substantially uniformly radially tensioned, said tensioning seal further including a slidable elastic annular sealing ring for confronting and sealing pressurized fluid in said fluid channel and being constructed and arranged to urge said deforming ring to engage and deform said blade into said recess channel in response to said pressurized fluid, said sealing ring including a pair of sealing lips extending outwardly towards the closed end of said fluid channel in sliding engagement with said fluid channel.

12. The improved apparatus of claim 11, wherein said projection establishes substantial point deforming contact with said blade.

13. The improved apparatus of claim 11, wherein said deforming ring is of a material and said projection has an arcuate partial cross section of a radius such that substantially full deforming force is maintained in the vicinity of the forwardmost edge of said projection when said deforming ring deforms said blade.

* * * * *